United States Patent
Okudaira et al.

(10) Patent No.: US 6,294,263 B1
(45) Date of Patent: Sep. 25, 2001

(54) POLYAMIDE LAMINATED FILM

(75) Inventors: Haruo Okudaira; Akira Matsuda; Sinitiro Okumura; Kazumoto Imai; Tsutomu Oko, all of Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/263,988

(22) Filed: Mar. 5, 1999

(30) Foreign Application Priority Data

Mar. 9, 1998 (JP) ................................... 10-076571

(51) Int. Cl.$^7$ ....................................... B32B 27/08
(52) U.S. Cl. .................... 428/474.4; 428/474.7; 428/474.8; 428/474.9; 428/475.5; 428/475.8; 428/476.3; 428/910
(58) Field of Search .............................. 428/474.9, 474.4, 428/474.7, 474.8, 475.5, 910, 475.8, 476.3

(56) References Cited

U.S. PATENT DOCUMENTS

| | | | |
|---|---|---|---|
| 4,908,272 | * 3/1990 | Harada et al. | 423/474.4 |
| 5,547,765 | * 8/1996 | Degrassi | 428/474.7 |
| 5,716,696 | * 2/1998 | Takashige et al. | 428/213 |
| 5,955,180 | * 9/1999 | Harada | 428/212 |

FOREIGN PATENT DOCUMENTS

| | | |
|---|---|---|
| 0688666 | 12/1995 | (EP) . |
| 08281889 | 10/1996 | (JP) . |

* cited by examiner

*Primary Examiner*—Leszek Kiliman
(74) *Attorney, Agent, or Firm*—Leydig, Voit & Mayer, Ltd.

(57) ABSTRACT

The present invention is to provide a polyamide laminated film comprising a resin layer A and a resin layer B formed on at least one surface of the resin layer A, the resin layer A being composed mainly of a m-xylene group-containing polyamide polymer (a-1) which is one prepared from monomer components containing a xylylenediamine compound as a main diamine component and an α,ω-aliphatic dicarboxylic acid having from 6 to 12 carbon atoms as a main dicarboxylic acid component, the xylylenediamine compound being m-xylylenediamine alone or a mixture of m-xylylenediamine and p-xylylenediamine, and the resin layer B being mainly composed of a mixed polymer (b-3) which is a mixture of from 99 to 80% by weight of an aliphatic polyamide (b-1) and from 1 to 20% by weight of an elastomer (b-2).

The laminated film is good in a gas barrier property and also in a flexural fatigue resistance and a transparency.

8 Claims, No Drawings

POLYAMIDE LAMINATED FILM

FIELD OF THE INVENTION

The present invention relates to a polyamide laminated film.

PRIOR ART

A film formed of a polyamide containing xylylenediamine as a constituent has characteristics that it is excellent in a gas barrier property and a heat resistance and further high in film strengths such as a break strength, a Young's modulus and the like in comparison with films formed of other plastics.

However, this polyamide film involves a problem that when it is used as a packaging material, pinholes tend to occur owing to a fatigue failure by bending in steps of vacuum packaging, transportation of commercial products packed with the packaging material, and the like. When pinholes occur in packaging materials of commercial products, the contents are contaminated, rotted, mildewed and further wetted, which leads to the decrease in the value of commercial products.

Meanwhile, an unstretched film or a stretched film formed of an aliphatic polyamide typified by nylon 6 or nylon 66 has been widely used as various packaging materials. This film is excellent in film strengths such as a flexural fatigue resistance, an impact strength and the like, but has a defect that a gas barrier property is poor.

Accordingly, in order to impart a gas barrier property to a film formed of an aliphatic polyamide, a polymer latex of vinylidene chloride has been coated on the surface of the film.

Nevertheless, this coated film has a defect that it becomes cloudy by itself through a treatment with hot water. It is further indicated that there is a possibility that an ingredient toxic to the human being, such as dioxin or the like is generated when a spent film is subjected to thermal disposal. This is a serious problem in the environmental pollution.

In order to solve the problems, a method in which a film is formed from a mixture of a polyamide polymer containing xylylenediamine as a constituent with an aliphatic polyamide (JP-B-51-29192), a method in which respective polyamides are melt-extruded with separate extruders, and laminated (JP-A-8-281889) and the like have been proposed.

However, even the films obtained by these methods do not reach satisfactory levels in which a gas barrier property is good and film properties required as a packaging film, such as a flexural fatigue resistance, a transparency and the like are provided.

DISCLOSURE OF THE INVENTION

A main object of the present invention is to solve the problems associated with the conventional polyamide laminated film, and to provide a polyamide laminated film suited for use in packaging, which is excellent in an oxygen gas barrier property, a flexural fatigue resistance, a transparency and the like, which can prevent deterioration or discoloration of contents when used as various packaging materials, and which can further protect contents from shock or the like during transportation.

The present inventors have assiduously conducted investigations to achieve the above-mentioned object, and have consequently found that a laminated film obtained by laminating a resin layer formed of a mixed polymer containing an aliphatic polyamide and an elastomer at a specific ratio on at least one surface of a resin layer formed of a specific m-xylylene group-containing polyamide polymer is good in a gas barrier property and also in a flexural fatigue resistance and a transparency.

Further, when the m-xylylene group-containing polyamide polymer is used as a mixture with a compatible polymer that meets specific requirements, a flexural fatigue resistance is further improved. These findings have led to the completion of the present invention.

That is, the present invention is to provide the following polyamide laminated film.

1. A polyamide laminated film comprising a resin layer A and a resin layer B formed on at least one surface of the resin layer A, the resin layer A being composed mainly of a m-xylylene group-containing polyamide polymer (a-1) which is one prepared from monomer components containing a xylylenediamine compound as a main diamine component and an $\alpha,\omega$-aliphatic dicarboxylic acid having from 6 to 12 carbon atoms as a main dicarboxylic acid component, the xylylenediamine compound being m-xylylenediamine alone or a mixture of m-xylylenediamine and p-xylylenediamine, and the resin layer B being mainly composed of a mixed polymer (b-3) which is a mixture of from 99 to 80% by weight of an aliphatic polyamide (b-1) and from 1 to 20% by weight of an elastomer (b-2).

2. A polyamide laminated film comprising a resin layer A and a resin layer B formed on at least one surface of the resin layer A, the resin layer A being composed mainly of a mixed polymer (a-3) which comprises 50% by weight or more of a m-xylylene group-containing polyamide polymer (a-1) and 50% by weight or less of a polymer (a-2), the polyamide polymer (a-1) being one prepared from monomer components containing a xylylenediamine compound as a main diamine component and an $\alpha,\omega$-aliphatic dicarboxylic acid having from 6 to 12 carbon atoms as a main dicarboxylic acid component, the xylylenediamine compound being m-xylylenediamine alone or a mixture of m-xylylenediamine and p-xylylenediamine, the polymer (a-2) having a melting point of 160° C. or more, a difference in melting point between the polymer (a-2) and the polyamide polymer (a-1) being 50° C. or less, the polymer (a-2) having a glass transition point of 60° C. or less, the polymer (a-2) having a compatibility with the polyamide polymer (a-1), and the resin layer B being mainly composed of a mixed polymer (b-3) which is a mixture of from 99 to 80% by weight of an aliphatic polyamide (b-1) and from 1 to 20% by weight of an elastomer (b-2).

3. The polyamide laminated film according to item 1, wherein the elastomer (b-2) is a polyamide-containing block copolymer comprising polyamide sections as hard segment and polyoxyalkylene glycol sections as soft segment, the polyamide sections being prepared from monomer components containing any of (1) a lactam, (2) an $\omega$-amino-aliphatic carboxylic acid, (3) an aliphatic diamine and an aliphatic dicarboxylic acid and (4) an aliphatic diamine and an aromatic dicarboxylic acid.

4. The laminated polyamide film according to item 2, wherein the elastomer (b-2) is a polyamide-containing block copolymer comprising polyamide sections as hard segment and polyoxyalkylene glycol sections as soft segment, the polyamide sections being prepared from monomer components containing any of (1) a lactam, (2) an ω-amino-aliphatic carboxylic acid, (3) an aliphatic diamine and an aliphatic dicarboxylic acid and (4) an aliphatic diamine and an aromatic dicarboxylic acid.

5. A food packaging material formed from the polyamide laminated film according to any one of items 1 to 4.

The polyamide laminated film of the present invention is described in detail below.

The polyamide laminated film of the present invention is formed by laminating a resin layer B on one surface or both surface of a resin layer A. The resin layer A is composed mainly of a m-xylylene group-containing polyamide polymer (a-1) which is one prepared from monomer components containing a xylylenediamine compound as a main diamine component and an α,ω-aliphatic dicarboxylic acid having from 6 to 12 carbon atoms as a main dicarboxylic acid component. The resin layer B is composed mainly of a mixed polymer (b-3) which is a mixture of from 99 to 80% by weight of an aliphatic polyamide (b-1) and from 1 to 20% by weight of an elastomer (b-2).

As the xylylenediamine compound which is the diamine component of the m-xylylene group-containing polyamide polymer (a-1) constituting the resin layer A, it is required that m-xylylenediamine is used alone or m-xylylenediamine and p-xylylenediamine are used as a mixture.

When the mixture of m-xylylenediamine and p-xylylenediamine are used, it is preferable that m-xylylenediamine is used at a ratio of 70% or more based on the total xylylenediamine.

Examples of the α,ω-aliphatic dicarboxylic acid having from 6 to 12 carbon atoms which is used as the dicarboxylic acid component include adipic acid, pimelic acid, suberic acid, azelaic acid, sebacic acid, dodecanoic acid and the like. These dicarboxylic acids can be used alone or in combination thereof.

With respect to the diamine component in the m-xylylene group-containing polyamide polymer (a-1) used in the present invention, it is required that the xylylenediamine compound is used as the main diamine component. Besides, the other diamine component, for example, an aliphatic diamine such as hexamethylenediamine or the like, an alicyclic diamine such as piperazine or the like, or an aromatic diamine such as p-bis-(2-aminoethyl)benzene or the like can be used as required.

With respect to the dicarboxylic acid component, it is required that the α,ω-aliphatic dicarboxylic acid is used as the main dicarboxylic acid component. Further, the other dicarboxylic acid component, for example, an aromatic dicarboxylic acid such as terephthalic acid or the like can be used. In addition, a lactam such as ε-caprolactam or the like, an ω-aminocarboxylic acid such as aminoheptanoic acid or the like, or an aromatic aminocarboxylic acid such as p-aminomethylbenzoic acid or the like can be used as a monomer component in combination with the diamine component and the dicarboxylic acid component.

Specific examples of the m-xylylene group-containing polyamide polymer (a-1) prepared from the xylylenediamine compound and the α,ω-aliphatic dicarboxylic acid can include homopolymers such as poly-m-xylylene adipamide, poly-m-xylylene pimeramide, poly-m-xylylene suberamide, poly-m-xylylene azelamide, poly-m-xylylene sebacamide, poly-m-xylylene dodecanediamide and the like; and copolymers such as a m-xylylene/p-xylylene adipamide copolymer, a m-xylylene/p-xylylene pimelamide copolymer, a m-xylylene/p-xylylene suberamide copolymer, a m-xylylene/p-xylylene azeramide copolymer, a m-xylylene/p-xylylene sebacamide copolymer and a m-xylylene/p-xylylene dodecanediamide copolymer.

In the m-xylylene group-containing polyamide polymer (a-1) used in the present invention, the structural unit formed of the xylylenediamine compound and the α,ω-aliphatic dicarboxylic acid having from 6 to 12 carbon atoms is contained preferably at a ratio of at least 70 mol %, more preferably at a ratio of at least 80 mol % in the molecular chain.

The resin layer A of the polyamide laminated film in the present invention can be formed of the m-xylylene group-containing polyamide polymer (a-1) alone, and it can further be formed of the mixed polymer (a-3) which is a mixture of the m-xylylene group-containing polyamide polymer (a-1) with a polymer (a-2) which has a melting point of 160° C. or more, a difference in melting point between the polymer (a-2) and the m-xylylene group-containing polyamide polymer (a-1) being 50° C. or less, which has a glass transition point of 60° C. or less and which has a compatibility with the m-xylylene group-containing polyamide polymer (a-1).

When the compatible polymer (a-2) that meets the above-mentioned conditions is used by being mixed with the m-xylylene group-containing polyamide polymer (a-1), the flex resistance of the resulting laminated film can be improved.

As the compatible polymer (a-2) that meets the above-mentioned conditions, there are a large number of polymers. Typical examples thereof include aliphatic polyamides such as nylon 6, nylon 6•6, nylon 6•10 and the like, aliphatic polyamide copolymers such as a nylon 6/6•6 copolymer, a nylon 6/6•10 copolymer, a nylon 6•6/6•10 copolymer and the like, a polyamide copolymer containing a small amount of an aromatic group and obtained by copolymerizing ε-caprolactam as a main component with a nylon salt of hexamethylenediamine and isophthalic acid or a nylon salt of m-xylylenediamine and adipic acid, and the like polyamide. Further, a polyester, a polyolefin and the like can be used as the compatible polymer (a-2).

When not the compatible polymer (a-2) that meets the above-mentioned conditions but a polymer having a melting point of less than 160° C. is used and mixed with the m-xylylene group-containing polyamide polymer(a-1), the resulting biaxially stretched film is wrinkled or spots are formed thereon if the film is heat-treated at a high temperature after stretching. For this reason, the film is hardly be heat-set at a high temperature. Further, when the film is heat-set at a low temperature, the increase in a hot water shrinkage is invited, with the result that no film having a good dimensional stability is obtained. Still further, with respect to the polymer which is different from the m-xylylene group-containing polyamide polymer (a-1) in a melting point by greater than 50° C., the mixture of this polymer and the m-xylylene group-containing polyamide polymer (a-1) is not stable in the kneaded state at the time of melting, and the sheet extruded is surged. Thus, it is undesirable. Furthermore, a polymer having a glass transition point of higher than 60° C. is poor in an effect of improving a flexural fatigue resistance of a film when it is mixed with the m-xylylene group-containing polyamide polymer (a-1). Incidentally, the polymer having the compatibility with the m-xylylene group-containing polyamide polymer (a-1) refers to a polymer that exhibits an appropriate dispersibility when mixed with the m-xylylene group-containing polyamide polymer (a-1). When such a compatible polymer is used, the transparency of the polyamide laminated film can be maintained substantially. Usually, a haze value of a laminated film formed by using this compatible polymer is 10% or less.

With respect to the mixing ratio of the m-xylylene group-containing polyamide polymer (a-1) and the compatible polymer (a-2), the amount of the compatible polymer (a-2) in the mixed polymer (a-3) is preferably 50% by weight or less, more preferably between 1 and 30% by weight, further preferably between 5 and 30% by weight. When the compatible polymer (a-2) is used in an amount exceeding 50% by weight, sufficient effect of improving the flexible fatigue resistance can not be observed, and further the gas barrier property, the yield point, the strength and the like are decreased. Thus, it is undesirable.

It is advisable that the molecular weights of the m-xylylene group-containing polyamide polymer (a-1) and the compatible polymer (a-2) are set to provide such a high melt viscosity that when the mixture of these polymers is melt-extruded, a uniform film surface is maintained. However, when the molecular weights are too high, the extrusion procedure becomes difficult. For this reason, in case of the polyamide polymer, the relative viscosity is preferably in the range of from 1.8 to 4.0. By the way, this relative viscosity is a value measured with an Ubbelohde viscometer at a concentration of 1 g/deciliter and a temperature of 20° C. using 96% sulfuric acid.

A method of mixing the m-xylylene group-containing polyamide polymer (a-1) with the compatible polymer (a-2) is not particularly limited. A method in which both polymers in the chipped state are mixed using a V-shaped blender and then melt-molded is commonly used.

Incidentally, the polymer constituting the resin layer A may contain the other thermoplastic resin unless the properties are impaired, examples thereof being polyester polymers such as polyethylene terephthalate, polybutylene terephthalate, polyethylene-2,6-naphthalate and the like, and polyolefin polymers such as polyethylene, polypropylene and the like. Usually, it is advisable that the m-xylylene group-containing polyamide polymer (a-1) or the mixed polymer (a-3) of the m-xylylene group-containing polyamide polymer (a-1) and the compatible polymer (a-2) is contained in an amount of 70% by weight or more based on the total polymer constituting the resin layer A.

The resin layer B is laminated on one surface or both surface of the resin layer A, and is composed mainly of the mixed polymer (b-3) which is a mixture of from 99 to 80% by weight of the aliphatic polyamide (b-1) and from 1 to 20% by weight of the elastomer (b-2).

The formation of such a laminated structure of the resin layer A and the resin layer B can improve the flexural fatigue resistance without impairing the excellent gas barrier property provided by the resin layer A.

Typical examples of the aliphatic polyamide (b-1) which is incorporated in the mixed polymer (b-3) constituting the resin layer B include nylon 6, nylon 6•6, nylon 12, nylon 6•10 and the like. Besides these, nylon 6/6•6, nylon 6/6•10, nylon 6•6/6•10, a copolymer obtained by copolymerizing ε-caprolactam as a main component with a small amount of a nylon salt of hexamethylenediamine and isophthalic acid, a nylon salt of m-xylylenediamine and adipic acid or the like, and the like polyamide are also available.

The aliphatic polyamide (b-1) used in the present invention is preferably one of which the relative viscosity measured by the above-mentioned method is between 1.8 and 4.0.

Specific examples of the elastomer (b-2) include polyamide-containing block copolymers such as polyether amide, polyether ester amide, polyester amide and the like; acrylic or methacrylic elastomers such as copolymers of ethylene and acrylates or methacrylates such as methyl acrylate, ethyl acrylate, methyl methacrylate, ethyl methacrylate and the like; and styrene-containing elastomers.

Especially, as the elastomer (b-2), it is advisable to use the polyamide-containing block polymer comprising polyamide sections as hard segment and polyoxyalkylene glycol sections as soft segment. The monomer component of the polyamide section constituting the hard segment of the block copolymer is preferably selected from any of (1) a lactam, (2) an (ω-amino-aliphatic carboxylic acid, (3) an aliphatic diamine and an aliphatic dicarboxylic acid and (4) an aliphatic diamine and an aromatic dicarboxylic acid. In this case, ε-caprolactam and the like can be mentioned as the lactam; aminoheptanoic acid and the like as the (ω-amino-aliphatic carboxylic acid; hexamethylenediamine and the like as the aliphatic diamine; adipic acid and the like as the aliphatic dicarboxylic acid; and terephthalic acid and the like as the aromatic dicarboxylic acid.

Further, examples of the polyoxyalkylene glycol section constituting the soft segment of the polyamide-containig block copolymer include polyoxyalkylene glycols containing an alkylene group having from 2 to 4 carbon atoms, such as polyoxytetramethylene glycol, polyoxyethylene glycol, polyoxy-1,2-propylene glycol and the like.

With respect to the proportions of the polyamide section and the polyoxyalkylene glycol section in the polyamide-containig block copolymer, it is preferable that the polyamide section is between 30 and 95% by weight, and the polyoxyalkylene glycol section is between 5 and 70% by weight, per 100% by weight in total of both sections.

The mixed polymer (b-3) constituting the resin layer B comprises from 99 to 80% by weight of the aliphatic polyamide (b-1) and from 1 to 20% by weight of the elastomer (b-2). When the amount of the elastomer (b-2) in the mixed polymer (b-3) is less than 1% by weight, the effect of improving the flexural fatigue resistance is low. When it exceeds 20% by weight, the transparency of the film becomes poor. Thus, it is undesirable. Regarding the especially preferable mixing ratio by which the flexural fatigue resistance and the transparency of the film are well-balanced, the mixing ratio of the elastomer (b-2) is in the range of from 3 to 10% by weight.

Further, the mixed polymer (b-3) constituting the resin layer B may contain, as required, the other thermoplastic resin unless the properties thereof are impaired. Specific examples of the other thermoplastic resin which can be used by being mixed with the mixed polymer (b-3) can be the same as those of the thermoplastic resin which can be incorporated in the polymer constituting the resin layer A. In general, it is advisable that the mixed polymer (b-3) of the aliphatic polyamide (b-1) and the elastomer (b-2) is contained in an amount of 70% by weight or more based on the total polymer constituting the layer B.

Furthermore, in order to improve film properties as a packaging material, such as a lubricity, an antistatic property and the like, various additives such as an antistatic agent, an inorganic lubricant, an organic lubricant, an anti-fogging agent, an anti-blocking agent, a heat stabilizer, an ultraviolet absorber, a dye, a pigment and the like can be added to one or both of the resin layer A and the resin layer B as required. In general, it is advisable that the amounts of these components are 5% by weight or less in each resin layer.

The thickness of the polyamide laminated film in the present invention is not particularly limited. When it is used as a packaging material, it can usually be 100 μm or less, and a film having a thickness of from 5 to 50 μm is generally used.

Moreover, the ratio of the thicknesses of the resin layer A and the resin layer B in the polyamide laminated film of the present invention can be set depending on the oxygen gas barrier property or the flexural fatigue resistance required, and it is not particularly limited. However, for providing a polyamide laminated film having an excellent oxygen gas barrier property, it is appropriate that the thickness of the resin layer A is usually set at 40% or more of the total film thickness.

The polyamide laminated film of the present invention can be produced by a known method. For example, any known methods can be employed such as a method in which polymers constituting respective layers are melted using separate extruders, and co-extruded from one die, a method in which polymers constituting respective layers are separately melt-extruded into films and then laminated through a lamination method, a method of a combination of these methods, and the like can be employed.

In addition, in the polyamide laminated film of the present invention, each layer thereof may be either an unstretched film layer or a stretched film layer. In order to improve an oxygen gas barrier property and a transparency of a laminated film and further a processing adaptability and the like of a film, a laminated film obtained by monoaxial or biaxial stretching is preferable. As the stretching method, a known method such as a flat-type consecutive biaxial stretching method, a flat-type simultaneous biaxial stretching method, a tubular method or the like can be employed. The degree of stretching may be determined, as required, depending on the use purpose of the laminated film. For example, in case of the biaxially stretched film, a film which is stretched from 2.0 to 4.0 times longitudinally and from 3.0 to 5.0 times transversely is preferable.

The polyamide laminated film of the present invention is excellent in the oxygen gas barrier property, has an elastic recovery force under the environment of room temperature or lower temperatures, is good in the impact strength and the flexural fatigue resistance and is also excellent in the transparency. The laminated film of the present invention having such characteristics is a film which is suited for use in various packages of foods, drugs and the like. When the laminated film of the present invention is used as packaging materials in packaging foods, especially water-containing products and the like, it is effective for preventing deterioration or discoloration of contents, breakage of packages owing to shock or the like during transportation, or the like. Further, when it is formed as a printing film, a good appearance is provided.

Foods to be packaged when the laminated film of the present invention is used as a food packaging material are not particularly limited. Processed meat products such as ham, sausage and the like, processed fish products and paste products such as boiled fish paste and the like can be mentioned.

When the polyamide laminated film of the present invention is used as a packaging material, it can be used in a flat form, and besides in the form of a tube, a bag or the like. For example, when a flat film is used, a packaging material of a suitable form can be produced by a usual method. When it is used as a seamless tube, it may be used by any method in which the film is cut to an appropriate length and directly used as a casing, a bag or the like.

EXAMPLES

The present invention is illustrated more specifically by referring to the following Examples. However, the present invention is not limited thereto. By the way, the evaluation of the film was conducted by the following measuring methods.

(1) Oxygen Permeability (cc/m$^2 \cdot$24 hr·atm)

Measured under conditions that a temperature was 20° C. and a relative humidity 77% using an OX-TRAN TWIN of Modern Control.

(2) Flexural Fatigue Resistance (Number of Pinholes)

A film was cut to a circular form having a diameter of 150 mm, and it was made into a bag. This was mounted on a tip of a glass tube of a bending machine. Feeding-in of compressed air (increased pressure 0.7 kg/cm$^2$) and exhaust (reduced pressure 760 mmHg) were alternatively conducted, and a flexural fatigue was imparted to the bag-like film at a rate of 7.5 times/min. The flexural fatigue was imparted 2,000 times to the bag-like film under such environment that a temperature was 23° C. and a relative viscosity 65%. The number of holes formed in the film was counted.

(3) Haze

Measured according to JIS K-7105 using a Haze Meter S Model supplied by K.K. Toyo Seiki Seisakusho.

Haze (%)=[$Td$(diffusion transmission %)/$Tt$(total light transmission %)]×100

(4) Relative Viscosity

Measured with Ubbelohde viscometer at a concentration of 1 g/deciliter and a temperature of 20° C. using 96% sulfuric acid.

Example 1

An unstretched sheet with a structure of resin layer B/resin layer A/resin layer B in which a total thickness was 220 μm and a ratio of the thickness of the resin layer A to the total thickness was 70% was produced by means of a 2-type 3-layer co-extrusion T-die equipment using the following polymers as a polymer for forming the resin layer A and a polymer for forming the resin layer B.

Polymer for forming the resin layer A: a mixed polymer comprising 90% by weight of poly-m-xylylene adipamide (relative viscosity (RV)=2.1) and 10% by weight of nylon 6.

Polymer for forming the resin layer B: a mixed polymer comprising 95% by weight of nylon 6 and 5% by weight of a block copolymer of polylauric lactam and polyether (made by Daicel.Huls, trade name: Diamide).

The resulting unstretched sheet was stretched 3.6 times longitudinally and then 3.6 times transversely to obtain a biaxially stretched film having a thickness of 17 μm.

The oxygen permeability, the number of holes and the haze of the resulting biaxially stretched film were measured. The results are shown in Table 1 below.

Example 2

A biaxially stretched film was produced in the same manner as in Example 1 except that a mixed polymer comprising 70% by weight of poly-m-xylylene adipamide (relative viscosity (RV)=2.1) and 30% by weight of nylon 6 was used as the polymer for forming the resin layer A. The oxygen permeability, the number of pinholes and the haze were measured. The results are shown in Table 1 below.

Example 3

A biaxially stretched film was produced in the same manner as in Example 1 except that a mixed polymer comprising 93% by weight of nylon 6 and 7% by weight of a block copolymer of polylauric lactam and polyether (made by Daicel•Huls, trade name: Diamide) was used as the polymer for forming the resin layer B. The oxygen permeability, the number of pinholes and the haze were measured. The results are shown in Table 1 below.

Example 4

A biaxially stretched film was produced in the same manner as in Example 1 except that poly-m-xylylene adipamide (relative viscosity (RV)=2.1) was used as the polymer for forming the resin layer A and a mixed polymer of 93% by weight of nylon 6 and 7% by weight of a block copolymer of polylauric lactam and polyether (made by Daicel•Huls, trade name: Diamide) as the polymer for the resin layer B. The oxygen permeability, the number of pinholes and the haze were measured. The results are shown in Table 1 below.

Comparative Example 1

A biaxially stretched film was produced in the same manner as in Example 1 except that poly-m-xylylene adipamide (relative viscosity (RV)=2.1) was used as the polymer for forming the resin layer A and nylon 6 as the polymer for forming the resin layer B. The oxygen permeability, the number of pinholes and the haze were measured. The results are shown in Table 1 below.

Comparative Example 2

A biaxially stretched film was produced in the same manner as in Example 1 except that poly-m-xylylene adipamide (relative viscosity (RV)=2.1) was used as both of the polymers for forming the resin layer A and the resin layer B. The oxygen permeability, the number of pinholes and the haze were measured. The results are shown in Table 1 below.

TABLE 1

| No. | Oxygen permeability cc/m$^2$.24 hr.atm) | Number of pinholes (pcs) | Haze (%) |
| --- | --- | --- | --- |
| Example 1 | 5.6 | 3 | 2.2 |
| Example 2 | 8.4 | 2 | 3.2 |
| Example 3 | 5.9 | 0 | 3.8 |
| Example 4 | 5.0 | 4 | 2.9 |
| Comparative Example 1 | 4.5 | 12 | 1.6 |
| Comparative Example 2 | 4.0 | 16 | 2.2 |

From Table 1, it becomes apparent that the polyamide laminated films of the present invention have well-balanced film properties with respect to the oxygen gas barrier property, the flexural fatigue resistance and the transparency and it is a practically useful film.

Meanwhile, the films in Comparative Examples were good in the oxygen gas barrier property but poor in the flexural fatigue resistance. Thus, they are practically problematic as a packaging material because a large number of pinholes tend to occur in the processing step or the transportation step.

What is claimed is:

1. A polyamide laminated film comprising a resin layer A and a resin layer B formed on at least one surface of the resin layer A, the resin layer A being composed mainly of a m-xylylene group-containing polyamide polymer (a-1) which is prepared from monomer components containing a xylylenediamine compound as a main diamine component and an α,ω-aliphatic dicarboxylic acid having from 6 to 12 carbon atoms as a main dicarboxylic acid component, the xylylenediamine compound being m-xylylenediamine alone or a mixture of m-xylylenediamine and p-xylylenediamine, and the resin layer B being mainly composed of a mixed polymer (b-3) which is a mixture of from 99 to 80% by weight of an aliphatic polyamide (b-1) and from 1 to 20% by weight of an elastomer (b-2).

2. A polyamide laminated film comprising a resin layer A and a resin layer B formed on at least one surface of the resin layer A, the resin layer A being composed mainly of a mixed polymer (a-3) which is a mixture of 50% by weight or more of a m-xylylene group-containing polyamide polymer (a-1) and 50% by weight or less of a polymer (a-2), the polyamide polymer (a-1) being one prepared from monomer components containing a xylylenediamine compound as a main diamine component and an α,ω-aliphatic dicarboxylic acid having from 6 to 12 carbon atoms as a main dicarboxylic acid component, the xylylenediamine compound being m-xylylenediamine alone or a mixture of m-xylylenediamine and p-xylylenediamine, the polymer (a-2) having a melting point of 160° C. or more, a difference in melting point between the polymer (a-2) and the polyamide polymer (a-1) being 50° C. or less, the polymer (a-2) having a glass transition point of 60° C. or less, the polymer (a-2) having a compatibility with the polyamide polymer (a-1), and the resin layer B being mainly composed of a mixed polymer (b-3) which is a mixture of from 99 to 80% by weight of an aliphatic polyamide (b-1) and from 1 to 20% by weight of an elastomer (b-2).

3. The polyamide laminated film according to claim 1, wherein the elastomer (b-2) is a polyamide-containing block copolymer comprising polyamide sections as hard segment and polyoxyalkylene glycol sections as soft segment, the polyamide sections being prepared from monomer components containing any of (1) a lactam, (2) an ω-amino-aliphatic carboxylic acid, (3) an aliphatic diamine and an aliphatic dicarboxylic acid and (4) an aliphatic diamine and an aromatic dicarboxylic acid.

4. The laminated polyamide film according to claim 2, wherein the elastomer (b-2) is a polyamide-containing block copolymer comprising polyamide sections as hard segment and polyoxyalkylene glycol sections as soft segment, the polyamide sections being prepared from monomer components containing any of (1) a lactam, (2) an ω-amino-aliphatic carboxylic acid, (3) an aliphatic diamine and an aliphatic dicarboxylic acid and (4) an aliphatic diamine and an aromatic dicarboxylic acid.

5. A food packaging material formed from the polyamide laminated film according to claim 1.

6. A food packaging material formed from the polyamide laminated film according to claim 2.

7. A food packaging material formed from the polyamide laminated film according to claim 3.

8. A food packaging material formed from the polyamide laminated film according to claim 4.

* * * * *